US007380791B2

(12) United States Patent
Gauselmann et al.

(10) Patent No.: US 7,380,791 B2
(45) Date of Patent: Jun. 3, 2008

(54) GAMING MACHINE USING CONTROLLABLE LEDS FOR REEL STRIP ILLUMINATION

(75) Inventors: Michael Gauselmann, Espelkamp (DE); David M. Tucker, Cave Creek, AZ (US)

(73) Assignee: Atronic International GmbH, Lübbecke (DE)

(*) Notice: Subject to any disclaimer, the term of this patent is extended or adjusted under 35 U.S.C. 154(b) by 460 days.

(21) Appl. No.: 10/846,610

(22) Filed: May 14, 2004

(65) Prior Publication Data

US 2005/0255907 A1 Nov. 17, 2005

(51) Int. Cl.

| | |
|---|---|
| ***A63F 71/00*** | (2006.01) |
| ***A63F 1/18*** | (2006.01) |
| ***A63F 9/24*** | (2006.01) |
| ***A63F 13/00*** | (2006.01) |
| ***G06F 17/00*** | (2006.01) |
| ***G06F 19/00*** | (2006.01) |

(52) U.S. Cl. .............................. 273/142 B; 273/138.1; 273/142 R; 273/143 R; 463/16; 463/17; 463/18; 463/19; 463/20; 463/21; 463/22; 463/30; 463/31; 463/32; 463/33; 463/34; 463/46; 463/47

(58) Field of Classification Search ............. 273/138.1, 273/142 B, 143 R, 142 R; 463/30–34, 16–22, 463/47

See application file for complete search history.

(56) References Cited

U.S. PATENT DOCUMENTS 5,388,829 A * 2/1995 Holmes .................. 273/143 R
5,683,296 A * 11/1997 Rasmussen .................. 463/20
5,688,172 A * 11/1997 Lorenzo Regidor .......... 463/20
5,839,957 A * 11/1998 Schneider et al. ............ 463/20
6,027,115 A * 2/2000 Griswold et al. ....... 273/143 R
6,129,355 A * 10/2000 Hahn et al. ............. 273/142 R
6,206,781 B1 * 3/2001 Sunaga et al. ................ 463/20
7,169,048 B2 * 1/2007 Nozaki et al. ................ 463/30
2002/0118182 A1 * 8/2002 Luther Weindorf ......... 345/204
2004/0132522 A1 * 7/2004 Seelig et al. .................. 463/16
2004/0185926 A1 * 9/2004 Emori ......................... 463/16
2004/0209682 A1 * 10/2004 Okada ......................... 463/31

FOREIGN PATENT DOCUMENTS

JP 2000079191 A * 3/2000
JP 2000140193 A * 5/2000
JP 2001120708 A * 5/2001
JP 2002143375 A * 5/2002

OTHER PUBLICATIONS

Translation of JP 2002-143375 A. Machine English Translation of abstract, detailed description, claims, and description of drawings.*

* cited by examiner

*Primary Examiner*—Robert Pezzuto
*Assistant Examiner*—Milap Shah
(74) *Attorney, Agent, or Firm*—Patent Law Group LLP; Brian D. Ogonowsky

(57) ABSTRACT

A backlight for a reel assembly is disclosed comprising a plurality of light emitting diodes (LEDs). An array of red, green, and blue diodes are positioned behind a translucent reel strip to backlight three adjacent symbols on a reel strip. The LEDs are individually controllable to vary the color output of the LED array for a full spectrum of colors including white. Groups of LEDs can be illuminated to optimally illuminate any number of symbols of any size. The LEDs may be controlled to highlight special symbols such as by blinking or changing colors. LEDs are also arranged on both sides of the reel strip in a vertical array so as to outline the edges of the reel strip.

22 Claims, 4 Drawing Sheets

GAMING MACHINE USING CONTROLLABLE LEDS FOR REEL STRIP ILLUMINATION

FIELD OF THE INVENTION

This invention relates to reel-type slot machines and, in particular, to an illumination device for backlighting the reel strips in a rotating reel assembly.

BACKGROUND

Conventional slot machines contain three or more reels, each having a set of symbols around its periphery. The reels are rotated and randomly stopped, and the combination of symbols across one or more paylines determines the award paid to the player. A conventional reel assembly includes a stepper motor that rotates a light plastic circular frame having a replaceable reel strip affixed around the periphery of the frame. Pulses are applied to the stepper motor to cause the stepper motor to rotate through any amount of rotation. The reel strips are translucent and are typically backlit with one or more conventional light bulbs. U.S. Pat. No. 5,839,957, incorporated herein by reference, describes an example of a reel assembly.

U.S. Pat. No. 5,388,829, incorporated herein by reference, provides an example of a reel assembly having light bulbs for backlighting the reel strip. If the slot machine is the type where three adjacent symbols on a reel strip are illuminated, three light bulbs may be fixed in a position to optimally illuminate the three symbols. In some cases, each light bulb is surrounded by walls that prevent the light from illuminating symbols other than the one directly in front of the light bulb. If the reel strip were replaced by a different reel strip having larger or smaller symbol positions, the backlight would not be optimum, since the backlights would not be centered behind the symbols on the new reel strip.

Additionally, such simple light bulbs used as backlights are constantly on and provide no information to the players.

SUMMARY

A backlight for a reel assembly is disclosed comprising a plurality of light emitting diodes (LEDs). In one embodiment, an array of red, green, and blue diodes are positioned behind a translucent reel strip to backlight three adjacent symbols on a reel strip. The red, green, and blue LEDs are individually controllable to vary the color output of the LED array for a full spectrum of colors including white. Controlling the LEDs not only enables controlling the color, but groups of LEDs can be illuminated to optimally illuminate any number of symbols of any size.

Additionally, the LEDs may be controlled to highlight special symbols such as by blinking or changing colors.

In one embodiment, LEDs are also arranged on both sides of the reel strip in a vertical array so as to outline the edges of the reel strip. These vertically arranged LEDs may be used to highlight a particular reel strip, or to show the direction of the reel by sequencing the illumination of the LEDs, or to indicate a left-to-right or right-to-left combination of symbols, or perform other functions.

The brightness of the LEDs is also easily controlled to adjust to the ambient light.

Other features and advantages of the LED array backlight are disclosed herein.

DETAILED DESCRIPTION

Figure 1:
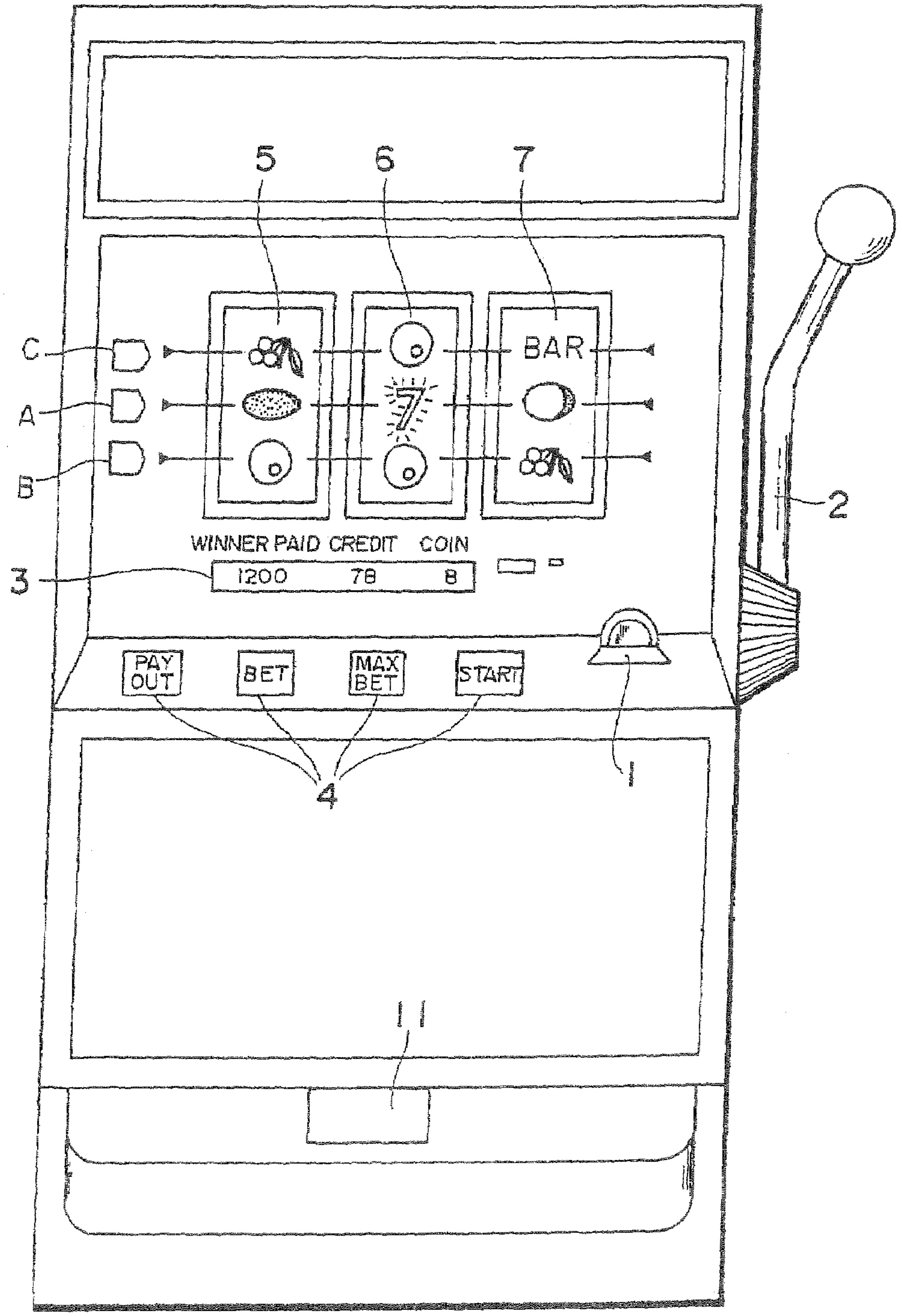
FIG. 1 is a front view of one example of a slot machine incorporating reels having the LED backlight of the present invention.

FIG. 1 is a front view of a slot machine that may be comprised of all well known and conventional elements except for the reel backlight assembly described in detail below. Accordingly, there is no need to describe the workings of the slot machine of FIG. 1 in detail.

The slot machine of FIG. 1 includes a coin slot 1, a handle 2, a meter 3 for identifying any necessary information, control buttons 4 for placing bets, spinning the reels, and cashing out, rotatable reels 5, 6, and 7 with reel strips, and a coin tray 11.

In operation, the player generates credits by inserting coins into coin slot 1. The slot machine may also receive bills, tickets, or any other form of payment. The player makes a bet by pressing the appropriate one of buttons 4 then pulls handle 2 or presses a start button. A CPU in the slot machine initiates the spinning of the three reels 5-7 and pseudo-randomly stops the rotation of the reels so that combinations of symbols appear across the paylines A, B, and C. Coins or credits are then awarded to the player based on these combinations. At any time, the player may press the payout button, and a number of coins corresponding to the total accumulated credits are then paid out by a coin hopper into coin tray 11.

Figure 2:
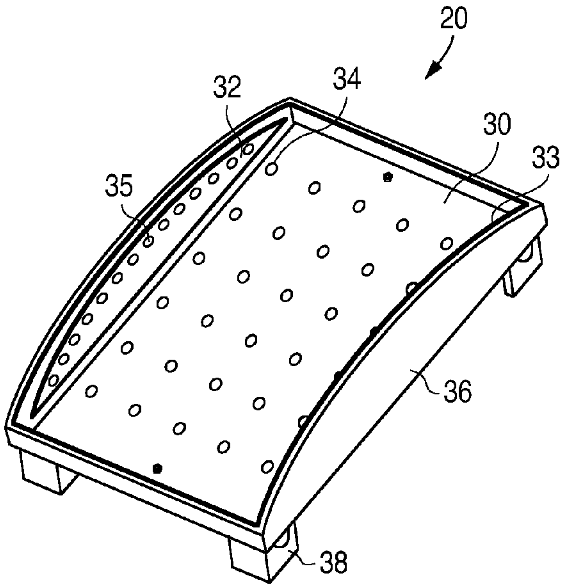
FIG. 2 is a perspective view of a reel backlight assembly that may be affixed to the frame of the reel assembly.
Figure 5:
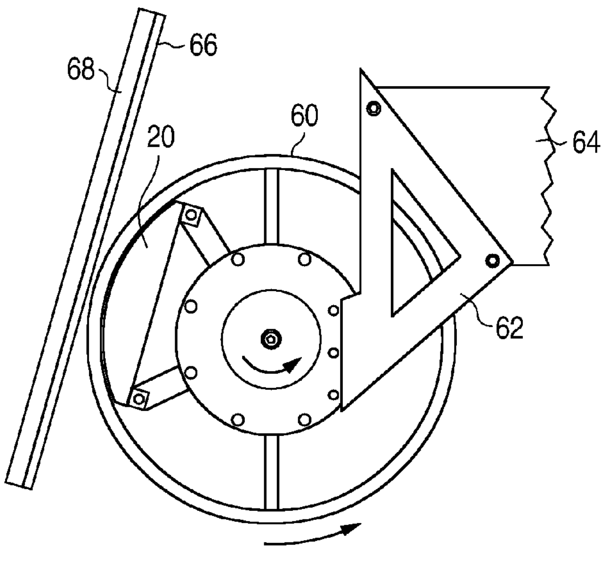
FIG. 5 is a side view of the reel backlight assembly affixed to the frame of a reel assembly in a slot machine.

FIG. 2 illustrates a reel backlight assembly 20 that is connected to a reel assembly, such as shown in FIG. 5. Backlight assembly 20 is positioned proximate to the back of the reel strip so that the reel may freely rotate while being backlit by assembly 20.

Backlight assembly 20 includes symbol backlight portion 30 and side portions 32 and 33. Portions 30, 32, and 33 are printed circuit boards on which are mounted LEDs 34 and 35. Only some of the LEDs are shown for simplicity. Conductive traces lead from the LEDs to standard electrical connectors. The printed circuit boards are affixed to a plastic frame 36. Frame 36 has appropriate flanges 38 or other mechanisms to allow assembly 20 to be affixed to a reel frame assembly or to any other portion of the slot machine for backlighting the reel strips.

A flexible diffuser sheet (not shown) may be affixed to the front of frame 36 if a more uniform backlight is desired. The frame 36 may include channels along the upper edges of the sides to receive the edges of a thin diffuser sheet to keep it in place.

Figure 4:
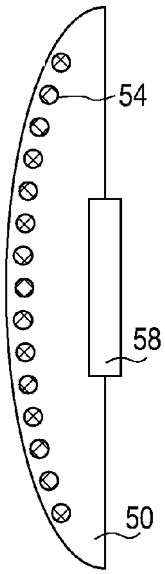
FIG. 4 illustrates a printed circuit board containing an array of LEDs for outlining the vertical edges of the reel strip, which forms a sidewall of the reel backlight assembly.
Figure 3:
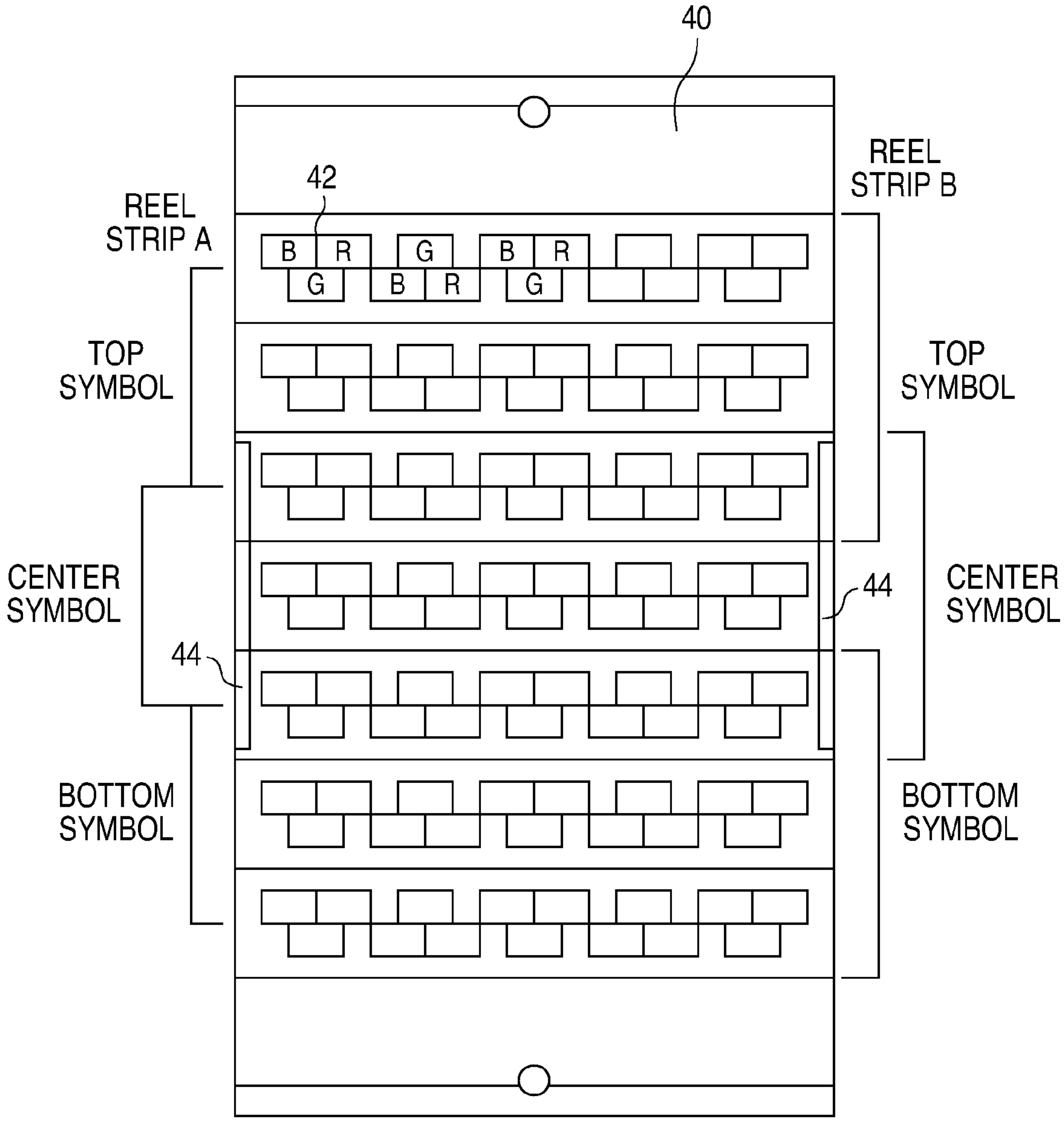
FIG. 3 is a front view of a printed circuit board with an array of RGB LEDs that forms part of the reel backlight assembly.

FIG. 3 is a front view of a printed circuit board 40 forming the backlight portion 30 in FIG. 2. Red, green, and blue LEDs 42 are electrically and mechanically connected to board 40 and form an array. In the embodiment of FIG. 4, there are 35 LEDs formed in an array of five columns and seven rows. Each LED 42 is actually a combination of a red, green, and blue LED mounted closely together or formed in a single package. Each LED (a semiconductor chip) is typically encased in epoxy, where the epoxy forms a lens that causes most of the light emitted by the LEDs to escape from the lens in a direction normal to the plane of the board 40. Each LED 42 has a red lead, a blue lead, a green lead, and a ground lead. The current running through each of the red, green, and blue LEDs determines the brightness of each of the three colors. By controlling the currents, any color can be produced by the combination of the red, green, and blue light, including white light. Such red, green, and blue LEDs (either individually or combined in a package) are widely available. In one embodiment, the LEDs 42 are surface mounted packages, avoiding the need to form holes in board 40.

Conventional conductive traces on board 40 are electrically connected to the various leads of the LEDs 42 and terminate in a standard connector 44 for coupling to control circuitry. The electrical and mechanical connection of RGB LEDs to a printed circuit board and to a connector is well known in the field of color displays and need not be described herein in detail.

The leads of the various LEDs in the array can be connected in a variety of configurations depending upon the desired lighting flexibility. For example, if it were desired to individually control the RGB color for each LED 42, then there must be a separate connector terminal for each red, green, and blue LED. Multiplexers or controllers on the board 40 could be used to reduce the number of connector terminals. If it were only desired to separately control each row of LEDs 42, then the leads of the LEDs in a row may be coupled together to reduce the number of connector terminals. LEDs 42 may be coupled in series and/or parallel. The connector 44 may comprise an array of sockets, pins, pads, wire bonds, or other types of connectors.

Since the LEDs 42 in the array are spaced from the reel strip, the light from each LED 42 spreads out and mixes somewhat with light from nearby LEDs so that the player does not see the individual LED quasi-point sources. The reel strip acts to diffuse light. An additional diffuser film may be affixed to the backlight assembly 20.

FIG. 3 illustrates how the LEDs 42 can be controlled to precisely backlight symbols on a variety of reel strips, even through the reel strips may have different size symbol positions. On the left side of FIG. 3 is illustrated the symbol positions of a reel strip A. The sizes of the top symbol position, the center symbol position, and the bottom symbol position are shown. For such a reel strip, it may be desirable to only associate the top two rows of the LEDs 42 with the top symbol, the middle three rows of LEDs 42 with the center symbol, and the bottom two rows of the LEDs 42 with the bottom symbol. The brightness of the various LEDs can be controlled so that the combined light output associated with each symbol is the same.

On the right side of FIG. 3 is shown the reel strip B symbol positions for the top symbol, the center symbol, and the bottom symbol. In the case of reel strip B, the top three rows of LEDs 42 would backlight the top symbol, the bottom three rows of LEDs 42 would backlight the bottom symbol, and the middle three rows would backlight the center symbol. Any row can be dimmed to create a desired brightness profile behind a symbol.

If the designer of the slot machine wishes to highlight a particular symbol displayed, such as the "7" symbol in FIG. 1, the software may be written to blink on and off the LEDs that backlight the center "7" symbol in the middle row. Assuming reel strip B was being used, the software would cause the middle three rows of the LEDs in FIG. 3 to blink, brighten, change color, or perform any other attention getting routine. If reel strip A were used, the designer may elect to brightly illuminate the middle row of LEDs and only dimly illuminate the rows above and below the middle row so that only the center symbol is highlighted.

Numerous other functions may be performed by the ability to selectively control the color and brightness of the various LEDs in the array. For example, a symbol or combination of symbols across the three or more reels may be highlighted by controlling the color, pattern, brightness, or any other attribute of the backlight. The LEDs may even be controlled to provide a star bursting pattern by, for example, illuminating the LEDs from the middle and then outward, to highlight special symbols.

FIG. 4 is a side view of a printed circuit board 50 forming a side portion 32 (FIG. 2) of the assembly 20. In FIG. 4, a single line of LEDs 54 is mechanically and electrically connected to board 50. Each LED 54 has its leads electrically coupled to a connector 58 so that the brightness of each LED may be individually controlled or controlled as a group. When board 50 is affixed to frame 36, the array of LEDs 54 forms a vertical strip of lights bordering the symbols on a single reel strip. LEDs 54 may be white light LEDs or may be RGB LEDs. A white light LED only has the ability to output white light. A white light LED is typically either a blue or ultraviolet LED with a phosphor coating that emits white light or emits a light that when combined with blue light appears to be white light. In one embodiment, all LEDs in the backlight assembly 20 are white light LEDs; however, the flexibility of the lighting display is reduced.

The effect of selectively illuminating the LEDs 54 on board 50 can create an attractive border light for each reel strip or can give the illusion of upward rotation or downward rotation by sequencing the lights from bottom to top or top to bottom to coincide with the rotation of the reels. Further, these lights may be used to identify a reel by only illuminating the lights for one reel. Additionally, in some slot machines, an award is only paid for combinations from the left to the right or from the right to the left. The LEDs 54 in board 50 may be illuminated so that the sequence of illumination across the whole front of the slot machine indicates that the winning symbol combination is from left to right or right to left. Such indication of the direction and the winning payline may also be made by controlling LEDs 42.

For the LEDs 54 on board 50, a side emitting LED lens may be appropriate such that the light is directed toward the player rather than across the front of the assembly.

FIG. 5 is a side view of a conventional plastic reel 60 being rotatably connected inside the slot machine. A support 62 connects the stationary part of the reel to the body 64 of the slot machine. A stepper motor (not shown) turns the plastic reel in either direction. The backlight assembly 20 is shown directly behind the periphery of the reel 60, over which a reel strip is mounted, so the reel and reel strip do not contact the backlight assembly. The reel strip typically has 18, 20, or 24 symbol positions.

In front of the reel 60 is the transparent opening of the slot machine. In one embodiment, the transparent opening of the slot machine includes an edge lit sheet of plexiglass 66 and a touch screen 68. The touch screen allows the player to make selections by touching areas of the touch screen displaying an image. The touch screen may display images in front of the reels or only display images around the periphery of the reels. The touch screen may include a liquid crystal layer and a thin film transistor array, forming a liquid crystal display (LCD), as well as a touch sensitive sheet over the LCD. The touch screen is backlit by the edge lit plexiglass, where the plexiglass has small ridges or other deformities that allow the light from the edge-feed to leak out the front of the plexiglass. Additional layers may be used in front of the reel.

Figure 6:
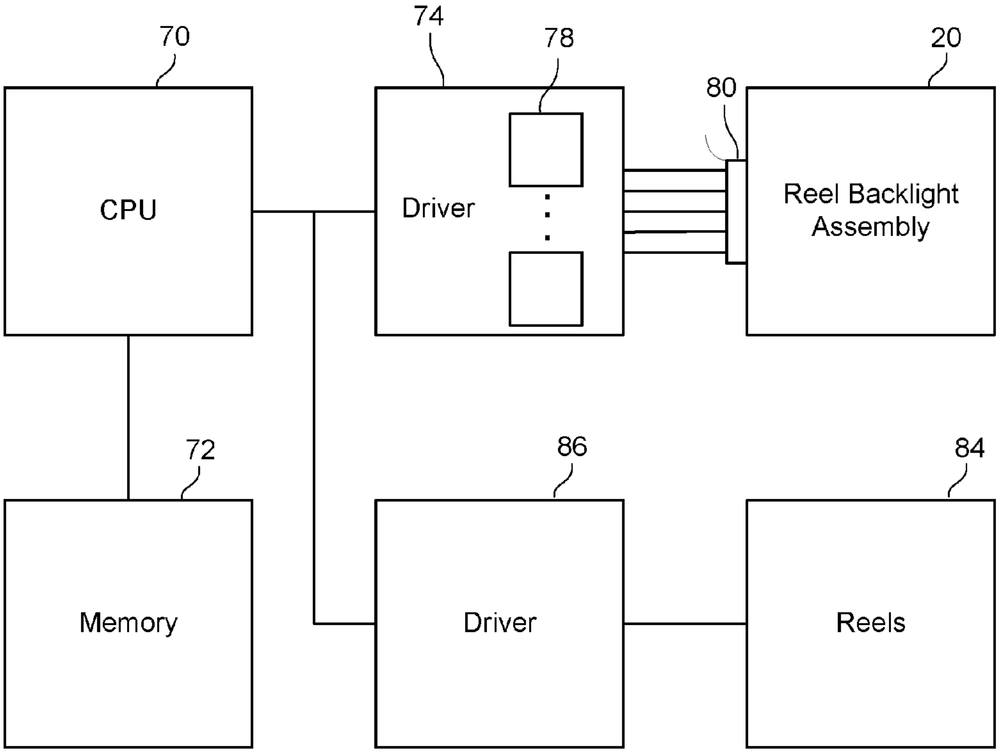
FIG. 6 is a schematic diagram of certain functional units for controlling the reel backlight assembly using the slot machine's main CPU.

FIG. 6 is a schematic diagram of various basic functional blocks in the slot machine related to the reel backlight assembly 20.

In FIG. 6, a conventional CPU 70 in the slot machine that controls various functions of the game is programmed by software stored in a memory 72. To control the reel backlight assembly 20, the CPU generates a digital code which is then received and decoded by a driver board 74. Driver board 74 contains various current controllers for selectively controlling the various LEDs in assembly 20. The digital code, which may be a series of digital codes, identifies the various LEDs to illuminate at any brightness level. Alternatively, there may be a microprocessor (or other type of controller such as a programmable gate array) on driver 74 which receives a high level command code from the CPU 70 and associates that code with detailed instructions for controlling the LED assembly. Various current controllers 78 are then controlled to provide power to selected red, green, blue, or white LEDs to illuminate those LEDs with any brightness and any pattern. Power to the various LEDs may be controlled by pulsewidth modulation or any other technique. A multiplexer may be contained on driver board 74 for addressing the various LEDs to limit the number of current controllers. Techniques to selectively control LEDs are well known and need not be described in detail herein. The various power signals are applied to the connectors 80 on assembly 20 for energizing the various LEDs shown in FIGS. 3 and 4. Any of the circuitry described above may be located on assembly 20.

The various reel assemblies 84 are also controlled by CPU 70 via driver 86 to begin rotation and stop rotation based upon the particular software program. The reel rotation and stopped positions may be coordinated with the light control signals for assembly 20 to highlight winning symbol combinations, special symbols, or other functions as previously described.

Having described the invention in detail, those skilled in the art will appreciate that given the present disclosure, modifications may be made to the invention without departing from the spirit and inventive concepts described herein. Therefore, it is not intended that the scope of the invention be limited to the specific embodiments illustrated and described.

What is claimed is:

1. A device comprising:

a rotatable reel for a gaming machine, the rotatable reel for supporting a reel strip around its periphery, the reel strip having symbols located along a central portion of the reel strip and having a border between the symbols and side edges of the reel strip;

a first array of light emitting diodes (LEDs) in a fixed position for backlighting the reel strip, the LEDs being controllable to selectively backlight portions of the reel strip, the first array of LEDs being mounted on a first circuit board that substantially faces a back surface of the reel strip;

a second array of LEDs forming a l×N array of LEDs arranged vertically and mounted on a second circuit board substantially perpendicular to the first circuit board and along a first side edge of the first circuit board for illuminating a first side edge of the reel strip, the LEDs in the second array of LEDs being closer to the reel strip than the LEDs in the first array of LEDs, the LEDs in the second array not being behind any symbols on the reel strip;

a third array of LEDs forming a l×N array of LEDs arranged vertically and mounted on a third circuit board substantially perpendicular to the first circuit board and along a second side edge of the first circuit board for illuminating a second side edge of the reel strip, the LEDs in the third array of LEDs being closer to the reel strip than the LEDs in the first array of LEDs, the LEDs in the third array not being behind any symbols on the reel strip; and control circuitry coupled to the LEDs in the first array, second array, and third array to control brightness levels of the LEDs, the control circuitry configured to control the first array of LEDs separately from the LEDs in the second array and third array, such that the LEDs in the second array and third array are controllable to highlight borders of the reel strip, and the LEDs in the first array are controllable to backlight one or more symbols on the reel strip.

2. The device of claim 1 wherein the LEDs in the first array comprise red, green, and blue LEDs, and wherein the LEDs in the first array are controllable to change backlight colors.

3. The device of claim 1 wherein the LEDs in the first array, second array, and third array are controllable to create dynamic backlight illumination patterns.

4. The device of claim 1 wherein the LEDs in the first array are arranged in a M×N rectangular array having a vertical dimension larger than a single symbol on the reel strip.

5. The device of claim 1 wherein the LEDs in the first array are arranged in a M×N rectangular array having a vertical dimension approximately equal to three adjacent symbol positions on the reel strip.

6. The device of claim 1 wherein the rotatable reel is a first rotatable reel, the device further comprising a second rotatable reel and a third rotatable reel, the first rotatable reel, second rotatable reel, and third rotatable reel each having an associated reel strip and being mounted side by side in a gaming machine, each of the second rotatable reel and third rotatable reel having a backlight comprising an array of light emitting diodes (LEDs) in a fixed position for backlighting the associated reel strip of the second rotatable reel and third rotatable reel, the LEDs being controllable to selectively illuminate portions of the reel strip.

7. The device of claim 6 further comprising one or more paylines across symbol positions of the first rotatable reel, second rotatable reel, and third rotatable reel.

8. The device of claim 7 wherein the LEDs in the first array are controllable to illuminate only those symbols across a payline that create a winning combination of symbols.

9. The device of claim 7 wherein the LEDs in any of the first array, the second array, and third array are controllable to convey a left-to-right winning combination or a right-to-left winning combination of symbols by sequentially backlighting symbols in a winning combination of symbols.

10. The device of claim 7 wherein the LEDs in the first array are controllable to highlight one or more particular symbols.

11. The device of claim 1 wherein the LEDs in the first array are selectively controllable to backlight different portions of the reel strip, each portion having a different symbol.

12. The device of claim 1 wherein the second array and the third array each have a curved shape substantially conforming to a curve of the reel strip.

13. The device of claim 1 wherein a vertical dimension of the second array and third array exceeds a dimension of a single symbol on the reel strip.

14. The device of claim 1 wherein a vertical dimension of the second array and third array is approximately equal to three adjacent symbols on the reel strip.

15. The device of claim 1 wherein the LEDs in the second array and third array are sequentially illuminated.

16. The device of claim 1 wherein the LEDs in the second array and the third array are side emitting so that light is directed toward a player rather than across the first array.

17. A method of backlighting reel strips in a gaming machine, the reel strips being mounted on rotatable reels, the reel strips having symbols located along a central portion of the reel strips and having a border between the symbols and side edges of each reel strip, the method comprising:

energizing a first array of light emitting diodes (LEDs) mounted in a fixed position for backlighting each reel strip, the LEDs being energized to selectively backlight portions of each reel strip, the first array of LEDs being mounted on a first circuit board that substantially faces a back surface of the reel strip;

energizing a second array of LEDs forming a l×N array of LEDs arranged vertically and mounted on a second circuit board substantially perpendicular to the first circuit board and along a first side edge of the first circuit board for illuminating a first side edge of the reel strip, the LEDs in the second array of LEDs being closer to the reel strip than the LEDs in the first array of LEDs, the LEDs in the second array not being behind any symbols on the reel strip;

energizing a third array of LEDs forming a l×N array of LEDs arranged vertically and mounted on a third circuit board substantially perpendicular to the first circuit board and along a second side edge of the first circuit board for illuminating a second side edge of the reel strip, the LEDs in the third array of LEDs being closer to the reel strip than the LEDs in the first array of LEDs, the LEDs in the third array not being behind any symbols on the reel strip; and controlling the first array of LEDs separately from the LEDs in the second array and third array for each reel strip, such that the LEDs in the second array and third array are controlled to highlight borders of the reel strip, and the LEDs in the first array are controlled to backlight one or more symbols on the reel strip.

18. The method of claim 17 wherein the LEDs in the first array comprise red, green, and blue LEDs, wherein the LEDs are energized to change backlight colors.

19. The method of claim 17 wherein the LEDs in the first array are energized to create dynamic backlight illumination patterns.

20. The method of claim 17 wherein the LEDs in the first array are arranged in a M×N rectangular array having a vertical dimension for selectively backlighting a plurality of adjacent symbols on the reel strip.

21. The method of claim 20 wherein some of the LEDs in the first array are energized to backlight a first symbol area and other of the LEDs in the first array are energized to backlight other symbol areas.

22. The method of claim 17 wherein a brightness level of the LEDs in the first array is controlled based on ambient light.

* * * * *